US012267152B2

(12) United States Patent
Luo et al.

(10) Patent No.: US 12,267,152 B2
(45) Date of Patent: Apr. 1, 2025

(54) SYNCHRONIZATION CIRCUIT AND SYNCHRONIZATION CHIP

(71) Applicant: Stream Computing Inc., Beijing (CN)

(72) Inventors: Fei Luo, Beijing (CN); Weiwei Wang, Beijing (CN)

(73) Assignee: Stream Computing Inc., Beijing (CN)

( * ) Notice: Subject to any disclaimer, the term of this patent is extended or adjusted under 35 U.S.C. 154(b) by 636 days.

(21) Appl. No.: 17/587,773

(22) Filed: Jan. 28, 2022

(65) Prior Publication Data

US 2022/0149963 A1     May 12, 2022

Related U.S. Application Data

(63) Continuation of application No. PCT/CN2019/102269, filed on Aug. 23, 2019.

(51) Int. Cl.
*H04J 3/06* (2006.01)

(52) U.S. Cl.
CPC .................. *H04J 3/0635* (2013.01)

(58) Field of Classification Search
CPC ...... H04J 3/0635; G06F 1/14; G06F 15/7807; G06F 15/17325; H04W 56/00
See application file for complete search history.

(56) References Cited

U.S. PATENT DOCUMENTS

| | | | |
|---|---|---|---|
| 5,083,265 A | 1/1992 | Valiant | |
| 5,434,995 A | 7/1995 | Oberlin et al. | |
| 6,216,174 B1 | 4/2001 | Scott et al. | |
| 7,142,955 B1 * | 11/2006 | Kern | B63H 21/213 701/21 |
| 8,405,415 B2 * | 3/2013 | Iwamoto | G01R 31/31907 324/73.1 |
| 9,405,488 B1 * | 8/2016 | Foley | G06F 11/1658 |
| 2012/0179896 A1 | 7/2012 | Salapura | |
| 2014/0019717 A1 * | 1/2014 | Yamashita | G06F 9/3842 712/42 |

(Continued)

FOREIGN PATENT DOCUMENTS

| | | |
|---|---|---|
| CN | 101588628 A | 11/2009 |
| CN | 102143572 A | 8/2011 |

(Continued)

OTHER PUBLICATIONS

Office Action for Chinese Patent Application No. 201980098145.0, dated Feb. 7, 2024.

(Continued)

*Primary Examiner* — Hoang-Chuong Q Vu
(74) *Attorney, Agent, or Firm* — Andrus Intellectual Property Law, LLP

(57) ABSTRACT

The present disclosure provides a synchronization circuit, including M group synchronization signal generating circuits and a node synchronization signal generating circuit. For the synchronization circuit provided in the embodiments of the present disclosure, synchronization indication signals can be separately generated by a plurality of group synchronization signal generating circuits, so as to drive a node synchronization signal generating circuit to generate synchronization signals, thereby efficiently implementing synchronization control over a plurality of nodes in a multi-node environment.

20 Claims, 2 Drawing Sheets

(56) References Cited

U.S. PATENT DOCUMENTS

| | | | |
|---|---|---|---|
| 2014/0334582 A1* | 11/2014 | Bock | G06F 1/12 |
| | | | 375/356 |
| 2018/0293932 A1* | 10/2018 | Duan | G09G 3/2096 |
| 2019/0121679 A1 | 4/2019 | Wilkinson | |
| 2019/0121784 A1 | 4/2019 | Wilkinson | |
| 2019/0144030 A1* | 5/2019 | Sakai | G06F 1/12 |
| | | | 318/3 |
| 2020/0074440 A1* | 3/2020 | Fullman | G06Q 20/3226 |
| 2020/0174851 A1* | 6/2020 | Manula | H04L 67/55 |
| 2020/0210365 A1* | 7/2020 | Wilkinson | G06F 9/30007 |
| 2020/0234396 A1* | 7/2020 | Qi | G06F 12/0207 |

FOREIGN PATENT DOCUMENTS

| | | |
|---|---|---|
| CN | 104461793 A | 3/2015 |
| CN | 106164867 A | 11/2016 |
| CN | 107295624 A | 10/2017 |
| CN | 107360623 A | 11/2017 |

OTHER PUBLICATIONS

International Search Report for PCT Application No. PCT/CN2019/102269, mailed May 9, 2020.
Extended European Search Report for European Patent Application No. EP19943829.2, dated Jul. 27, 2022.

* cited by examiner

SYNCHRONIZATION CIRCUIT AND SYNCHRONIZATION CHIP

CROSS-REFERENCE TO RELATED APPLICATION

This application is a continuation application of International Patent Application No. PCT/CN2019/102269, filed on Aug. 23, 2019, the entire contents of which are incorporated herein by reference for all purposes.

TECHNICAL FIELD

The present disclosure relates to the field of electronic circuits, and in particular, to a synchronization circuit and a synchronization chip.

BACKGROUND

A large variety and volume of data in the era of intelligence presents a good development opportunity for parallel computing technologies. Existing parallel computing technologies such as a bulk synchronous parallel (BSP) computing model may be used in a system-level application, such as a computer cluster composed of multiple servers, for parallel computing, or may be used in chip-level applications, such as multi-core chips, for parallel computing, or certainly may be used in systems composed of cores, servers, and chips. In a process of performing a computing task through the parallel computing technologies, a plurality of nodes (for example, a plurality of computers, a plurality of servers, a plurality of chips, a plurality of cores, and/or a plurality of computing ports) need to be controlled to implement accurate synchronization.

In existing synchronization technologies, one node of a plurality of nodes that need to be synchronized is often designated to manage sending of a synchronization signal. In an example, in a process of performing parallel computing, the plurality of nodes that need to be synchronized separately start to compute after receiving the synchronization signal, and perform communication to send and receive data after computation is completed. After completing the computation and communication, each node sends a synchronization ready indication signal (or a synchronization request indication signal) to the designated node. After receiving the synchronization ready indication signals from all the nodes that need to be synchronized (for example, every time the designated node receives the synchronization ready indication signal sent by one node, the designated node determines whether the synchronization ready indication signals sent by all the nodes that need to be synchronized have been received), the designated node sends the synchronization signal to all the nodes that need to be synchronized. In the above synchronization process, a time span between two synchronization signals is usually referred to as one super step.

In a synchronization process in the prior art, nodes that need to be synchronized send synchronization ready indication signals to the designated node in the form of a message via a bus or communication network. The designated node also sends a synchronization signal to the nodes that need to be synchronized in the form of a message via the bus or communication network, resulting in a relatively high latency. In addition, when there are a large number of nodes that need to be synchronized or when there is a plurality of groups of nodes that need to be synchronized (nodes to be synchronized in each group are synchronized in this group, and usually the synchronization is not performed across different groups), control logic for controlling the synchronization of the nodes is very complex and error-prone, and this also significantly increases loads on the bus or communication network, which further increases the latency. Therefore, it is difficult to efficiently implement synchronization control in a multi-node environment in the prior art.

SUMMARY

The embodiments of the present disclosure provide a synchronization circuit and a synchronization chip, which allow synchronization indication signals to be separately generated by a plurality of group synchronization signal generating circuits, so as to drive a node synchronization signal generating circuit to generate synchronization signals, thereby efficiently implementing synchronization control over a plurality of nodes in a multi-node environment.

According to a first aspect, embodiments of the present disclosure provide a synchronization circuit, including M group synchronization signal generating circuits and a node synchronization signal generating circuit, M being a positive integer, wherein an input terminal of each group synchronization signal generating circuit in the M group synchronization signal generating circuits is configured to connect to N nodes, N being a positive integer, and N being greater than or equal to M; an output terminal of each group synchronization signal generating circuit in the M group synchronization signal generating circuits is connected to the node synchronization signal generating circuit; an output terminal of the node synchronization signal generating circuit is configured to connect to the N nodes; the group synchronization signal generating circuit is configured to generate a synchronization indication signal; and the node synchronization signal generating circuit is configured to generate a synchronization signal based on the synchronization indication signal generated by the group synchronization signal generating circuit.

According to a second aspect, embodiments of the present disclosure provide a synchronization chip, including a synchronization circuit, N nodes, and N first synchronization dedicated communication lines, wherein the synchronization circuit includes M group synchronization signal generating circuits and a node synchronization signal generating circuit, M being a positive integer, wherein an input terminal of each group synchronization signal generating circuit in the M group synchronization signal generating circuits is configured to connect to the N nodes, N being a positive integer, and N being greater than or equal to M; an output terminal of each group synchronization signal generating circuit in the M group synchronization signal generating circuits is connected to the node synchronization signal generating circuit; an output terminal of the node synchronization signal generating circuit is configured to connect to the N nodes; the group synchronization signal generating circuit is configured to generate a synchronization indication signal; the node synchronization signal generating circuit is configured to generate a synchronization signal based on the synchronization indication signal generated by the group synchronization signal generating circuit; and the N first synchronization dedicated communication lines are in one-to-one correspondence with the N nodes, and the N first synchronization dedicated communication lines are configured to respectively transmit synchronization ready indication signals from the N nodes to the synchronization circuit.

According to a third aspect, embodiments of the present disclosure provide an electronic device. The electronic device includes: a memory configured to store computer-readable instructions; and one or more processors coupled to the memory, and configured to run the computer-readable instructions, so that the processor is caused to run to control any of the synchronization circuits according to the embodiments of the present disclosure to perform synchronization control on nodes, or to control any of the synchronization chips according to the embodiments of the present disclosure to perform synchronization control on nodes.

According to a fourth aspect, embodiments of the present disclosure provide a non-transitory computer readable storage medium. The computer readable storage medium is configured to store computer-readable instructions, and the computer-readable instructions, upon execution by a computer, cause the computer to control any of the synchronization circuits according to the embodiments of the present disclosure to perform synchronization control on nodes, or to control any of the synchronization chips according to the embodiments of the present disclosure to perform synchronization control on nodes.

According to a fifth aspect, embodiments of the present disclosure provide a computer program. The computer program, upon execution by a computer, causes the computer to control any of the synchronization circuits according to the embodiments of the present disclosure to perform synchronization control on nodes, or to control any of the synchronization chips according to the embodiments of the present disclosure to perform synchronization control on nodes.

The present disclosure provides a synchronization circuit, including M group synchronization signal generating circuits and a node synchronization signal generating circuit, M being a positive integer, wherein an input terminal of each group synchronization signal generating circuit in the M group synchronization signal generating circuits is configured to connect to N nodes, N being a positive integer; an output terminal of each group synchronization signal generating circuit in the M group synchronization signal generating circuits is connected to the node synchronization signal generating circuit; an output terminal of the node synchronization signal generating circuit is configured to connect to the N nodes; the group synchronization signal generating circuit is configured to generate a synchronization indication signal; and the node synchronization signal generating circuit is configured to generate a synchronization signal based on the synchronization indication signal generated by the group synchronization signal generating circuit. The synchronization circuit provided in the embodiments of the present disclosure allows synchronization indication signals to be separately generated by a plurality of group synchronization signal generating circuits so as to drive a node synchronization signal generating circuit to generate synchronization signals, thereby efficiently implementing synchronization control over a plurality of nodes in a multi-node environment.

The above description is only an overview of the technical solutions of the present disclosure. For a clearer understanding of the technical means of the present disclosure for implementation according to the content of the specification, and to make the above and other objectives, features, and advantages of the present disclosure clearer and more comprehensible, detailed description is provided as follows with reference to preferred embodiments and the accompanying drawings.

BRIEF DESCRIPTION OF THE DRAWINGS

The above and other features, advantages, and aspects of embodiments of the present disclosure will become more apparent in conjunction with the accompanying drawings and with reference to the following specific embodiments. Throughout the accompanying drawings, the same or similar reference numerals represent the same or similar elements. It should be understood that the accompanying drawings are schematic and that the originals and elements are not necessarily drawn to scale.

DETAILED DESCRIPTION

Figure 1:
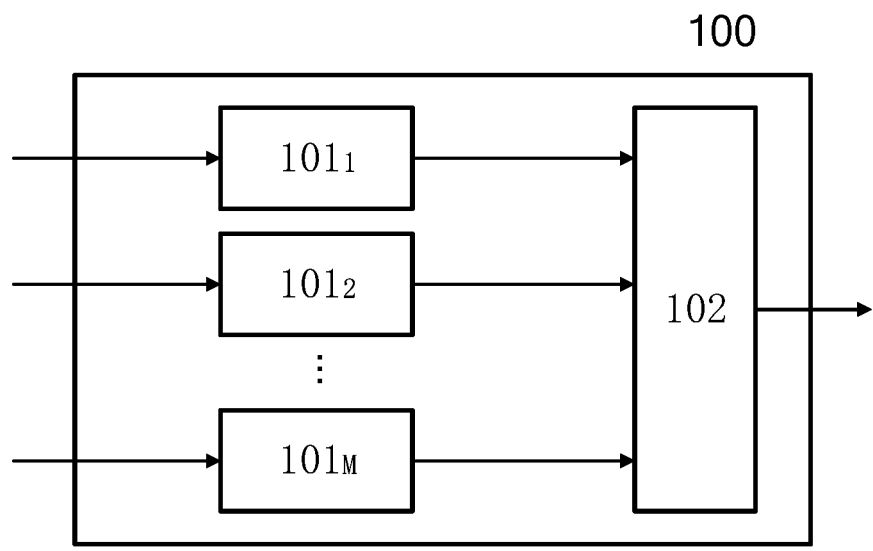
FIG. 1 is a schematic structural diagram of a synchronization circuit according to an embodiment of the present disclosure.

Embodiments of the present disclosure will be described in greater detail below with reference to the accompanying drawings. While some embodiments of the present disclosure are shown in the accompanying drawings, it should be understood that the present disclosure may be implemented in various forms and should not be construed as being limited to the embodiments set forth herein, instead these embodiments are provided for a more thorough and complete understanding of the present disclosure. It should be understood that the accompanying drawings and embodiments of the present disclosure are for exemplary purposes only and are not intended to limit the scope of protection of the present disclosure.

It should be understood that the individual steps documented in the method embodiments of the present disclosure may be performed in a different order, and/or in parallel. In addition, the method embodiments may include additional steps and/or omit the steps illustrated. The scope of the present disclosure is not limited in this regard.

The term "include" and its variations are used herein as an open inclusion, that is, "including, but not limited to". The term "based on" means "based, at least in part, on". The term "an embodiment" means "at least one embodiment". The term "another embodiment" means "at least one additional embodiment". The term "some embodiments" means "at least some embodiments". Relevant definitions of other terms will be given in the descriptions below.

It should be noted that the concepts such as "first" and "second" mentioned in the present disclosure are used only to distinguish between different apparatuses, modules or units, and are not intended to define the order or mutual interdependence of the functions performed by these apparatuses, modules or units. The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another. A unit or module may be implemented purely by software, purely by hardware, or by a combination of hardware and software. In a pure software implementation, for example, the unit or module may include functionally related code blocks or software components, that are directly or indirectly linked together, so as to perform a particular function. For example, a "signal generating module" may also be referred to as a "signal generating circuit" or a "signal generator".

It should be noted that the modifications of "one", "a" and "plurality of" referred to in the present disclosure are illustrative rather than limiting, and it should be understood by those skilled in the art to mean "one or more" unless the context clearly indicates otherwise.

The names of messages or information exchanged between the plurality of apparatuses in the embodiments of the present disclosure are used for illustrative purposes only and are not intended to limit the scope of the messages or information.

FIG. 1 is a schematic structural diagram of a synchronization circuit according to an embodiment of the present disclosure. As shown in FIG. 1, a synchronization circuit 100 includes M group synchronization signal generating circuits $101_1$ to $101_M$ and a node synchronization signal generating circuit 102, M being a positive integer.

An input terminal of each group synchronization signal generating circuit in the M group synchronization signal generating circuits $101_1$ to $101_M$ is configured to be connected to N nodes, N is a positive integer, and N is greater than or equal to M. An output terminal of each group synchronization signal generating circuit in the M group synchronization signal generating circuits $101_1$ to $101_M$ is connected to the node synchronization signal generating circuit 102. An output terminal of the node synchronization signal generating circuit 102 is configured to be connected to the N nodes.

According to the structure of the synchronization circuit 100 shown in FIG. 1, because each of the M group synchronization signal generating circuits $101_1$ to $101_M$ includes an input terminal for connecting to the N nodes, each of the M group synchronization signal generating circuits $101_1$ to $101_M$ may receive synchronization ready indication signals from the N nodes through the input terminal. Because the node synchronization signal generating circuit 102 includes an output terminal configured to be connected to the N nodes, the node synchronization signal generating circuit 102 may send a synchronization signal to any node in the N nodes through the output terminal. As understood by those of ordinary skill in the art, the nodes in the embodiments of the present disclosure include hardware with computing power and/or input/output capabilities, including, for example, cores, computers, servers, chips, and/or ports.

In the embodiments of the present disclosure, the group synchronization signal generating circuit is configured to generate a synchronization indication signal; and the node synchronization signal generating circuit is configured to generate a synchronization signal based on the synchronization indication signal generated by the group synchronization signal generating circuit.

According to the structure of the synchronization circuit 100 shown in FIG. 1, because the output terminal of each group synchronization signal generating circuit in the M group synchronization signal generating circuits $101_1$ to $101_M$ is connected to the node synchronization signal generating circuit 102, each group synchronization signal generating circuit in the M group synchronization signal generating circuits $101_1$ to $101_M$ can send, through the output terminal of the group synchronization signal generating circuit, the synchronization indication signal generated to the node synchronization signal generating circuit 102, so that the node synchronization signal generating circuit 102 is instructed via the synchronization indication signal to generate a synchronization signal. In response to receiving the synchronization indication signal from one or more of the M group synchronization signal generating circuits $101_1$ to $101_M$, the node synchronization signal generating circuit 102 generates a synchronization signal of a corresponding node. Further optionally, the node synchronization signal generating circuit 102 sends the generated synchronization signal to one or more nodes in the N nodes through the output terminal of the node synchronization signal generating circuit 102, to control the one or more nodes in the N nodes to perform synchronization. In an optional embodiment, the node synchronization signal generating circuit 102 includes N output terminals, and the N output terminals are configured to be connected to the N nodes, so that the node synchronization signal generating circuit 102 may respectively send, through the N output terminals, the synchronization signal generated to the N nodes. For example, in response to receiving the synchronization indication signal from one group synchronization signal generating circuit in the M group synchronization signal generating circuits $101_1$ to $101_M$, the node synchronization signal generating circuit 102 simultaneously sends the generated synchronization signal to one or more nodes in the N nodes, to implement synchronization control on the one or more nodes in the N nodes.

The synchronization circuit according to the embodiments of the present disclosure includes M group synchronization signal generating circuits, and synchronization indication signals can be separately generated by M group synchronization signal generating circuits so as to drive a node synchronization signal generating circuit to generate synchronization signals, thereby efficiently implementing synchronization control over a plurality of nodes in a multi-node environment.

It needs to be noted that the M group synchronization signal generating circuits $101_1$ to $101_M$ in the embodiments of the present disclosure have the same structure. For the purpose of clearly describing the embodiments of the present disclosure to facilitate understanding of the embodiments of the present disclosure, the group synchronization signal generating circuit $101_1$ in the M group synchronization signal generating circuits $101_1$ to $101_M$ is described below. For the structure of the group synchronization signal generating circuits $101_2$ to $101_M$, reference may be made to the same or corresponding description of the group synchronization signal generating circuit $101_1$.

Referring to FIG. 1, the group synchronization signal generating circuit $101_1$ includes an input terminal and an output terminal, so that synchronization ready indication signals may be received from the N nodes through the input terminal. Each synchronization ready indication signal is configured for indicating that a node sending the synchronization ready indication signal is in a synchronization ready state. The synchronization ready state represents that the node is ready for synchronization. The synchronization indication signal generated by the group synchronization signal generating circuit $101_1$ may be sent to the node synchronization signal generating circuit 102 through the output terminal. The synchronization indication signal is configured for instructing the node synchronization signal generating circuit 102 to generate the synchronization signal.

In an optional embodiment, the group synchronization signal generating circuit includes N input terminals. The N input terminals are in one-to-one correspondence with the N nodes. The N nodes are respectively configured to receive the synchronization ready indication signals from the N nodes. For example, the group synchronization signal generating circuit $101_1$ includes N input terminals, and when the group synchronization signal generating circuit $101_1$ receives the synchronization ready indication signal from a node through one of the N input terminals, it represents that the node is in a synchronization ready state and is ready for synchronization.

In another optional embodiment, the group synchronization signal generating circuit includes N output terminals. For example, the group synchronization signal generating circuit $101_1$ includes N output terminals. The N output terminals are in one-to-one correspondence with the N nodes. The N output terminals are configured to be connected to the node synchronization signal generating circuit 102. When the group synchronization signal generating circuit $101_1$ sends, through one or more of the N output terminals, the synchronization indication signal generated by the group synchronization signal generating circuit $101_1$ to the node synchronization signal generating circuit 102, the node synchronization signal generating circuit 102 is instructed to generate a synchronization signal. The synchronization signal corresponds to the one or more output terminals of the group synchronization signal generating circuit $101_1$. In other words, because the one or more output terminals of the group synchronization signal generating circuit $101_1$ correspond to one or more nodes, the synchronization signal further corresponds to the one or more nodes corresponding to the one or more output terminals of the group synchronization signal generating circuit $101_1$. Further, the node synchronization signal generating circuit 102 may send the synchronization signal to the one or more nodes corresponding to the one or more output terminals of the group synchronization signal generating circuit $101_1$, to control the one or more nodes to implement synchronization.

In an optional embodiment, each group synchronization signal generating circuit in the M group synchronization signal generating circuits includes a node synchronization indicating module (i.e., node synchronization indicator), a synchronization ready signal generating module (i.e., synchronization ready signal generator), and a group node synchronization indication signal generating module (i.e., group node synchronization indication signal generator); the node synchronization indicating module is configured to indicate to-be-synchronized nodes in the N nodes; the synchronization ready signal generating module is configured to generate a synchronization ready signal when each node in the to-be-synchronized nodes is ready for synchronization; and the group node synchronization indication signal generating module is configured to generate the synchronization indication signal based on the synchronization ready signal.

Figure 2:
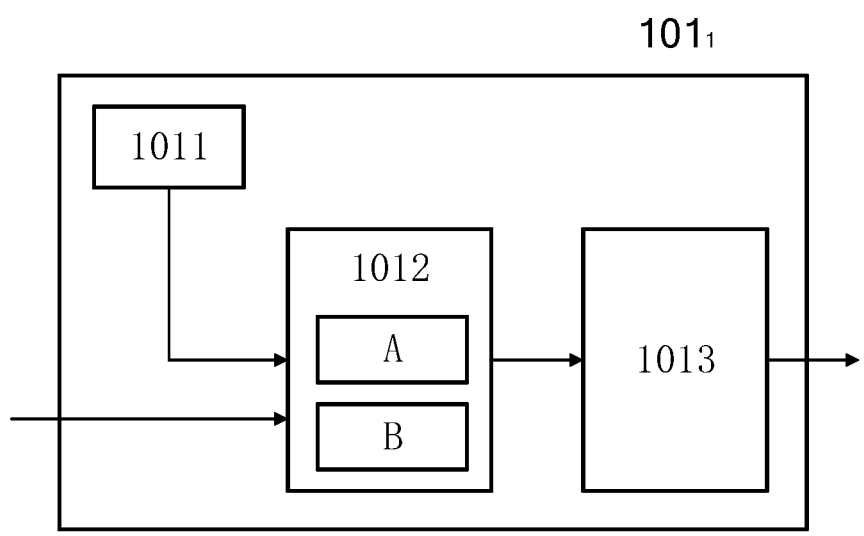
FIG. 2 is a schematic structural diagram of a group synchronization signal generating circuit according to an embodiment of the present disclosure.

FIG. 2 is a schematic structural diagram of a group synchronization signal generating circuit according to an embodiment of the present disclosure. An example in which the schematic structural diagram of the group synchronization signal generating circuit shown in FIG. 2 is the structural diagram of the group synchronization signal generating circuit $101_1$ is provided for description. The group synchronization signal generating circuit $101_1$ includes a node synchronization indicating module $101_1$, a synchronization ready signal generating module 1012, and a group node synchronization indication signal generating module 1013.

The node synchronization indicating module $101_1$ is configured to indicate to-be-synchronized nodes in the N nodes. As discussed above, a multi-node environment, for example, includes the N nodes. Some or all nodes in the N nodes may be grouped into one or more groups to perform a task. For the one or more groups, nodes in each group require synchronization control (nodes across different groups usually do not need to be synchronized). By means of the optional embodiments provided in the present disclosure, the to-be-synchronized nodes in the N nodes may be indicated through the node synchronization indicating module 1011 (for example, the to-be-synchronized nodes belong to the same group, and need to operate under synchronization control). That is, the group synchronization signal generating circuit $101_1$ is configured to perform synchronization control on the to-be-synchronized nodes in the N nodes indicated by the node synchronization indicating module 1011. Optionally, the node synchronization indicating module includes a register, the register includes at least N register bits, the N register bits are in one-to-one correspondence with the N nodes, register bits that correspond to the to-be-synchronized nodes in the N register bits are configured as a first value, and register bits that correspond to nodes other than the to-be-synchronized nodes in the N nodes in the N register bits are configured as a second value.

In an example, the group synchronization signal generating circuit $101_1$ is configured to perform synchronization control on X (X is a positive integer and X<N) nodes in the N nodes. The group synchronization signal generating circuit $101_2$ is configured to perform synchronization control on the (N−X) nodes in the N nodes, so that register bits corresponding to the X nodes in the N register bits of the group synchronization signal generating circuit $101_1$ are configured as the first value, and register bits corresponding to (N−X) nodes in the N register bits of the group synchronization signal generating circuit $101_1$ are configured as the second value, while the register bits corresponding to the (N−X) nodes in the N register bits of the group synchronization signal generating circuit $101_2$ are configured as the first value, and the register bits corresponding to the X nodes in the N register bits of the group synchronization signal generating circuit $101_2$ are configured as the second value. Other group synchronization signal generating circuits $101_3$ to $101_M$ other than the group synchronization signal generating circuit $101_1$ and the group synchronization signal generating circuit $101_2$ in the M group synchronization signal generating circuits may be disabled, or may be configured to be deactivated, or N register bits in the registers of the group synchronization signal generating circuits $101_3$ to $101_M$ may be configured as the second value.

Optionally, the values of the at least N register bits are configured according to a configuration instruction received by the group synchronization signal generating circuit. For example, the group synchronization signal generating circuit $101_1$ receives the configuration instruction from the outside of the synchronization circuit, then the register bits corresponding to the X nodes in the N register bits are configured as the first value and the register bits corresponding to the (N−X) nodes in the N register bits are configured as the second value according to the configuration instruction. For example, the configuration instruction is received from an external control circuit or from a core, a microcontroller unit (MCU), a host or the like outside the synchronization circuit. That is, the values of the at least N register bits are configured through the external control circuit or the core, the MCU, the host or the like outside the synchronization circuit.

For example, when the external control circuit determines, according to a received first task, that the task only needs to be performed by a first group of nodes, the external control circuit configures a register in a first group synchronization signal generating circuit, so that the register bits corresponding to the first group of nodes in the first group synchronization signal generating circuit have the first value.

When the external control circuit simultaneously receives a second task and a third task, the external control circuit assigns a second group of nodes to perform the second task and a third group of nodes to perform the third task. That is, the external control circuit configures a register in a second group synchronization signal generating circuit, so that register bits corresponding to the second group of nodes in the register have the first value. In addition, the external control circuit configures a register in a third group synchronization signal generating circuit, so that register bits corresponding to the third group of nodes in the register have the first value. Because the synchronization of the second group of nodes and the synchronization of the third group of nodes are controlled by different group synchronization signal generating circuits, the synchronization of the second group of nodes and the synchronization of the third group of nodes may or may not be performed simultaneously, which depends on the time at which the group synchronization signal generating circuits send the synchronization signals.

When the external control circuit simultaneously receives a fourth task and a fifth task, if it is determined that these two tasks may share one synchronization signal, the external control circuit assigns a first subgroup to perform the fourth task and a second subgroup to perform the fifth task. That is, the external control circuit configures a register in a fourth group synchronization signal generating circuit, so that register bits corresponding to the first subgroup of nodes and the second subgroup of nodes in the register have the first value. In this case, because the synchronization of the first subgroup and the synchronization of the second subgroup are both controlled by the fourth group synchronization signal generating circuit, the first subgroup and the second subgroup share one synchronization signal.

The synchronization ready signal generating module 1012 is configured to generate a synchronization ready signal when each node in the to-be-synchronized nodes is ready for synchronization. The node synchronization indicating module 1011 indicates, in the N nodes, nodes that require synchronization control by the group synchronization signal generating circuit $101_1$, that is, the to-be-synchronized nodes. The synchronization ready signal generating module 1012 may determine, according to indication of the node synchronization indicating module 1011, whether each node in the to-be-synchronized nodes is ready for synchronization, and generate a synchronization ready signal when each node in the to-be-synchronized nodes is ready for synchronization. It may be considered that the synchronization ready signal indicates that the to-be-synchronized nodes are all ready for synchronization.

In an example, the synchronization ready signal generating module 1012 in the group synchronization signal generating circuit $101_1$ determines, according to indication of the node synchronization indicating module 1011, that the X nodes in the N nodes are the to-be-synchronized nodes. Every time the synchronization ready indication signal sent by one node in the X nodes is received through the input terminal of the group synchronization signal generating circuit $101_1$, it is determined whether the synchronization ready indication signal has been received from every node in the X nodes. After the synchronization ready indication signal has been received from the last node in the X nodes, the synchronization ready signal generating module 1012 determines that the synchronization ready indication signal has been received from every node in the X nodes, and generates the synchronization ready signal.

The group node synchronization indication signal generating module 1013 is configured to generate the synchronization indication signal based on the synchronization ready signal. The group node synchronization indication signal generating module 1013 generates the synchronization indication signal in response to that the synchronization ready signal generating module 1012 generates the synchronization ready signal.

In an example, an output terminal of the synchronization ready signal generating module 1012 is connected to the input terminal of the group node synchronization indication signal generating module 1013. When the synchronization ready signal generating module 1012 determines that each node in the to-be-synchronized nodes is ready for synchronization, the synchronization ready signal is generated through the output terminal of the synchronization ready signal generating module 1012. After receiving the synchronization ready signal through the input terminal of the group node synchronization indication signal generating module 1013, the group node synchronization indication signal generating module 1013 generates the synchronization indication signal.

In another example, the node synchronization indicating module 1011 indicates, in the N nodes, nodes that require synchronization control by the group synchronization signal generating circuit $101_1$, that is, the to-be-synchronized nodes. The group node synchronization indication signal generating module 1013 generates a synchronization indication signal corresponding to the to-be-synchronized nodes in response to that the synchronization ready signal generating module 1012 generates the synchronization ready signal. Further, for example, the group synchronization signal generating circuit $101_1$ includes N output terminals. The N output terminals are in one-to-one correspondence with the N nodes. The synchronization indication signals may be sent through output terminals corresponding to the to-be-synchronized nodes in the N output terminals. The node synchronization signal generating circuit 102 may generate the synchronization signal in response to receiving the synchronization indication signals from the group synchronization signal generating circuit $101_1$, and send the synchronization signal to the to-be-synchronized nodes, to control the to-be-synchronized nodes to implement synchronization.

According to the optional embodiments provided in the present disclosure, the synchronization circuit includes M group synchronization signal generating circuits. Each of the M group synchronization signal generating circuits includes the node synchronization indicating module, so that one or more of the M group synchronization signal generating circuits can be flexibly selected, and respective to-be-synchronized nodes are flexibly configured for the one or more selected group synchronization signal generating circuits. Through the selected one or more of the M group synchronization signal generating circuits, the synchronization control of the respective to-be-synchronized nodes is flexibly realized (for example, two group synchronization signal generating circuits are determined from the M group synchronization signal generating circuits, one of the two group synchronization signal generating circuits performs synchronization control on the X nodes, and the other one performs synchronization control on the N–X nodes, where X is a positive integer).

Optionally, the synchronization ready signal generating module includes a shielding module (i.e., shield) and a synchronization determining module (i.e., synchronization determiner). The shielding module is configured to: receive synchronization ready indication signals from the N nodes, and generate an output signal according to indication of the node synchronization indicating module. The synchronization determining module is configured to: determine, according to the output signal of the shielding module, whether each node in the to-be-synchronized nodes is ready for synchronization, and generate the synchronization ready signal when it is determined that each node in the to-be-synchronized nodes is ready for synchronization.

The group synchronization signal generating circuit $101_1$ is took as an example. For the purpose of flexibility, the input terminal of the group synchronization signal generating circuit $101_1$ is configured to be connected to the N nodes, and therefore the group synchronization signal generating circuit $101_1$ can receive the synchronization ready indication signals from each of the N nodes. However, the to-be-synchronized nodes that are indicated by the node synchronization indicating module $101_1$ of the group synchronization signal generating circuit $101_1$ and require synchronization control by the group synchronization signal generating circuit $101_1$ may only include some nodes in the N nodes, for example, the X nodes. When the group synchronization signal generating circuit $101_1$ is used to perform synchronization control, the reception of synchronization ready indication signals from nodes that do not need to be synchronized in the N nodes, for example, the N–X nodes, does not affect the synchronization control performed by the group synchronization signal generating circuit $101_1$.

Therefore, according to the foregoing optional embodiments of the present disclosure, referring to FIG. 2, the group synchronization signal generating circuit $101_1$ includes a shielding module A and a synchronization determining module B. The shielding module A is configured to: receive synchronization ready indication signals from the N nodes through the input terminal of the group synchronization signal generating circuit $101_1$, and generate an output signal according to indication of the node synchronization indicating module $101_1$. Optionally, the synchronization ready indication signals received from the to-be-synchronized nodes directly serve as output signals of the shielding module A, and the synchronization ready indication signals received from the nodes that do not need to be synchronized are directly shielded (that is, output signals of the shielding module A do not include the synchronization ready indication signals received from the nodes that do not need to be synchronized).

Optionally, the synchronization ready indication signals received from the to-be-synchronized nodes directly serve as output signals of the shielding module A. For the nodes that do not need to be synchronized, regardless of whether the synchronization ready indication signals are received from the nodes that do not need to be synchronized, the output signal of the shielding module A is kept at a value that does not affect the generation of the synchronization signal of the to-be-synchronized nodes.

Optionally, the shielding module A generates a first output signal for the synchronization ready indication signals received from the to-be-synchronized nodes, and generates a corresponding second output signal for the nodes that do not need to be synchronized. The synchronization determining module B determines, according to the output signal of the shielding module, whether each node in the to-be-synchronized nodes is ready for synchronization, and generates the synchronization ready signal when it is determined that each node in the to-be-synchronized nodes is ready for synchronization.

Optionally, the shielding module includes N output signal generating modules (i.e., output signal generators). The N output signal generating modules are in one-to-one correspondence with the N nodes. The shielding module is further configured to: for the to-be-synchronized nodes indicated by the node synchronization indicating module, generate, in response to receiving the synchronization ready indication signals from the to-be-synchronized nodes, a first output signal through the output signal generating modules corresponding to the to-be-synchronized nodes; and for nodes other than the to-be-synchronized nodes indicated by the node synchronization indicating module in the N nodes, generate a second output signal through the output signal generating modules corresponding to the nodes other than the to-be-synchronized nodes in the N nodes.

In an example, the shielding module A of the group synchronization signal generating circuit $101_1$ includes N output signal generating modules. According to indication of the node synchronization indicating module 1011, the shielding module A generates, every time the synchronization ready indication signal is received from one of the to-be-synchronized nodes, a first signal through the output signal generating modules corresponding to the to-be-synchronized nodes, and generates, for nodes that do not need to be synchronized other than the to-be-synchronized nodes in the N nodes, a second signal through the output signal generating modules corresponding to the nodes that do not need to be synchronized.

The second signal may be the same as the first signal. In this case, every time the synchronization determining module B receives the first signal from one output signal generating module corresponding to the to-be-synchronized nodes in the N output signal generating modules of the shielding module A, the synchronization determining module B determines whether the first signal has been received from all the N output signal generating modules (the output signal generating modules corresponding to the nodes that do not need to be synchronized have already generated the first signal). When determining that the first signal has been received from all the N output signal generating modules, the synchronization determining module B generates the synchronization ready signal.

The second signal may be different from the first signal. In this case, every time the synchronization determining module B receives the first signal from one output signal generating module corresponding to the to-be-synchronized nodes in the N output signal generating modules of the shielding module A, the synchronization determining module B determines whether the first signal has been received from all the output signal generating modules corresponding to the to-be-synchronized nodes (if the second signal has been received from one output signal generating module, the synchronization determining module B determines that the output signal generating module corresponding to the second signal does not correspond to the to-be-synchronized nodes, so that when the synchronization determining module B determines whether the first signal has been received from all the output signal generating modules corresponding to the to-be-synchronized nodes, the output signal generating module corresponding to the second signal may be neglected). When determining that the first signal has been received from all the output signal generating modules corresponding to the to-be-synchronized nodes, the synchronization determining module B generates the synchronization ready signal.

In an optional embodiment, the group node synchronization indication signal generating module 1013 is further configured to: generate, in response to receiving the synchronization ready signal, the synchronization indication signal corresponding to the to-be-synchronized nodes indicated by the node synchronization indicating module. Referring to FIG. 2, the synchronization ready signal generating module 1012 of the group synchronization signal generating circuit 101$_1$ (or the synchronization determining module B of the synchronization ready signal generating module 1012) generates the synchronization ready signal. It may be considered that the synchronization ready signal indicates that the to-be-synchronized nodes corresponding to the group synchronization signal generating circuit 101$_1$ are all in a synchronization ready state. Therefore, in response to receiving the synchronization ready signal, the group node synchronization indication signal generating module 1013 of the group synchronization signal generating circuit 101$_1$ generates the synchronization indication signal corresponding to the to-be-synchronized nodes according to indication of the node synchronization indicating module 1011.

In an example, for example, the group node synchronization indication signal generating module 1013 generates (sends), in response to receiving the synchronization ready signal, the synchronization indication signal through the output terminals corresponding to the to-be-synchronized nodes in the N output terminals of the group synchronization signal generating circuit 101$_1$, to instruct the node synchronization signal generating circuit 102 to generate the synchronization signal corresponding to the to-be-synchronized nodes.

For the embodiment in which the node synchronization signal generating circuit 102 includes N output terminals configured to be connected to the N nodes, optionally, the node synchronization signal generating circuit 102 is further configured to: generate the synchronization signal corresponding to the to-be-synchronized nodes indicated by the node synchronization indicating module in response to receiving the synchronization indication signal corresponding to the to-be-synchronized nodes; and send the synchronization signal through output terminals corresponding to the to-be-synchronized nodes in the N output terminals. That is, the synchronization indication signal received by the node synchronization signal generating circuit 102 from the group node synchronization indication signal generating module 1013 is a synchronization indication signal corresponding to the to-be-synchronized nodes. The node synchronization signal generating circuit 102 may determine the to-be-synchronized nodes based on the synchronization indication signal, and send, through the output terminals corresponding to the to-be-synchronized nodes in the N output terminals, the synchronization signal generated by the node synchronization signal generating circuit 102.

Figure 3:
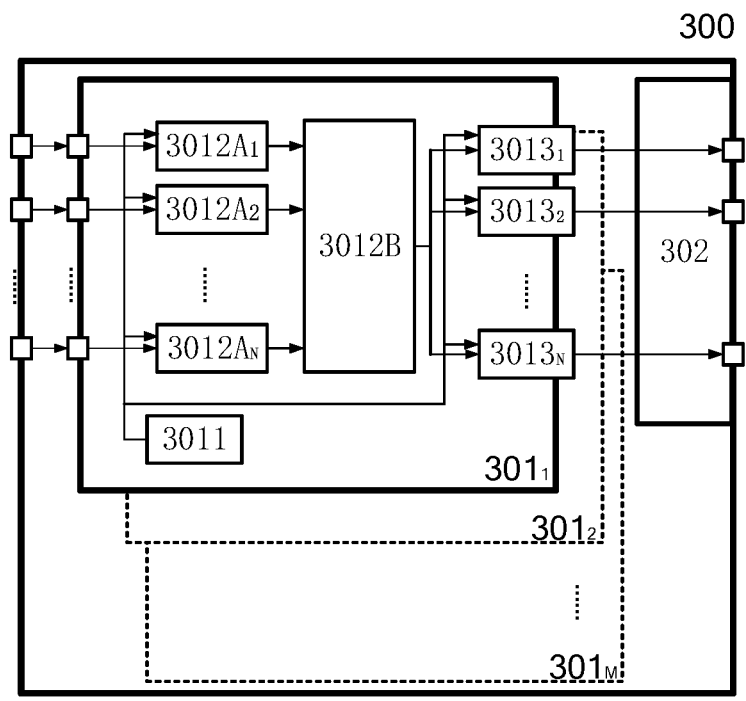
FIG. 3 is a schematic structural diagram of an optional embodiment of a synchronization circuit according to an embodiment of the present disclosure.

FIG. 3 is a schematic structural diagram of an optional embodiment of a synchronization circuit according to an embodiment of the present disclosure. Referring to FIG. 3, a synchronization circuit 300 includes M group synchronization signal generating circuits 301$_1$ to 301$_M$ and a node synchronization signal generating circuit 302. It needs to be noted that, when M is larger, more circuits are required, and the costs are higher. However, when M is larger, an execution speed of a plurality of tasks in a multi-node environment is faster. Therefore, the value of M may be determined according to a requirement of an application environment and a cost restriction.

For example, a plurality of nodes in a multi-node environment may be grouped into a plurality of groups, and therefore there may be a plurality of groups that require synchronization, so that the value of M may be relatively large. That is, the synchronization circuit includes a relatively large number of group synchronization signal generating circuits, so that each group synchronization signal generating circuit controls one of the groups that requires synchronization. As previously described for one or more embodiments of the present disclosure and as understood by those skilled in the art, the synchronization circuit includes a fixed number of, that is, M group synchronization signal generating circuits. However, when the synchronization circuit is used to perform synchronization control on the nodes, one or more of the M group synchronization signal generating circuits may be flexibly used as required.

In the optional embodiment, the M group synchronization signal generating circuits 301$_1$ to 301$_M$ have the same structure. For the purpose of clearly describing the optional embodiments to facilitate understanding of the optional embodiments, the group synchronization signal generating circuit 301$_1$ in the M group synchronization signal generating circuits 301$_1$ to 301$_M$ is described below. For the structure of the group synchronization signal generating circuits 301$_2$ to 301$_M$, reference may be made to the same or corresponding description of the group synchronization signal generating circuit 301$_1$.

In the optional embodiment, the group synchronization signal generating circuit 301$_1$ includes N input terminals. The N input terminals are in one-to-one correspondence with N nodes. The N input terminals are respectively configured to receive the synchronization ready indication signals from the N nodes. Each synchronization ready indication signal is configured for indicating that a node sending the synchronization ready indication signal is in a synchronization ready state and/or is ready for synchronization. In an example, the synchronization circuit 300, for example, includes N input terminals. The N input terminals of the synchronization circuit 300 are in one-to-one correspondence with the N nodes. N input terminals of each group synchronization signal generating circuit of the M group synchronization signal generating circuits 301$_1$ to 301$_M$ are respectively connected to the N input terminals of the synchronization circuit 300, so that the synchronization ready indication signals sent by the N nodes are transmitted to each group synchronization signal generating circuit in the M group synchronization signal generating circuits 301$_1$ to 301$_M$ via the input terminals of the synchronization circuit 300. For example, the synchronization ready indication signal sent by a first node in the N nodes is simultaneously transmitted to the input terminal corresponding to the first node of each group synchronization signal generating circuit in the M group synchronization signal generating circuits 301$_1$ to 301$_M$ via the input terminal corresponding to the first node in the synchronization circuit 300.

In the optional embodiment, the group synchronization signal generating circuit 301$_1$ includes a register 3011. The register 3011 includes N register bits. The N register bits are in one-to-one correspondence with the N input terminals of the group synchronization signal generating circuit 301$_1$ (in other words, the N register bits are in one-to-one correspondence with the N nodes corresponding to the N input terminals of the group synchronization signal generating circuit 301$_1$). The register indicates the to-be-synchronized nodes corresponding to the group synchronization signal generating circuit $301_1$ through values of the N register bits of the register. For example, register bits corresponding to the to-be-synchronized nodes in the N register bits are configured as the first value. Other register bits in the N register bits are configured as a second value. The to-be-synchronized nodes include nodes that need to be synchronized in the N nodes. For example, it may be understood that, the to-be-synchronized nodes are nodes that are assigned in one same group, and perform the same task.

In the optional embodiment, the group synchronization signal generating circuit $301_1$ includes N shielding submodules $3012A_1$ to $3012A_N$ and a synchronization determining module 3012B. The N shielding submodules $3012A_1$ to $3012A_N$ are in one-to-one correspondence with the N input terminals of the group synchronization signal generating circuit $301_1$ (in other words, the N shielding submodules $3012A_1$ to $3012A_N$ are in one-to-one correspondence with the N nodes corresponding to the N input terminals of the group synchronization signal generating circuit $301_1$). Each shielding submodule of the N shielding submodules $3012A_1$ to $3012A_N$ includes two input terminals, that is, a first input terminal and a second input terminal. The first input terminal is connected to a corresponding input terminal in the N input terminals included in the group synchronization signal generating circuit $301_1$. The second input terminal is connected to a corresponding register bit of the register $301_1$. Each shielding submodule of the N shielding submodules $3012A_1$ to $3012A_N$ includes one output signal generating module. Each shielding submodule of the N shielding submodules $3012A_1$ to $3012A_N$ sends the generated output signal to the synchronization determining module 3012B through the output signal generating module of the shielding submodule.

In an example, the register bits that correspond to the to-be-synchronized nodes in the N register bits of the register 3011 are configured as the first value, and the register bits that correspond to nonsynchronous nodes other than to-be-synchronized nodes in the N nodes are configured as the second value. In this case, all the output signal generating modules of the shielding submodules connected to the register bits configured as the second value in the N shielding submodules generate output signals indicating that nodes corresponding to these shielding submodules are in a synchronization ready state (for example, these output signals are configured as high levels; it should be noted that at this time it is not necessary to determine whether synchronization ready indication signals are received from the nonsynchronous nodes, and the output signals are directly generated through the output signal generating modules). For the shielding submodules connected to the register bits configured as the first value in the N shielding submodules, in response to receiving from the first input terminals of these shielding submodules synchronization ready indication signals sent by the corresponding nodes, output signals indicating that nodes corresponding to these shielding submodules are in a synchronization ready state are generated through the output signal generating modules of the shielding submodules.

Every time it is detected that the output signal generating module of one shielding submodule in the N shielding submodules generates the output signal, the synchronization determining module 3012B determines whether the output signal generating modules of all the shielding submodules in the N shielding submodules have generated the output signals. When determining that the output signal generating modules of all the shielding submodules in the N shielding submodules have generated the output signals (it should be noted that in a current optional embodiment, the output signal generating module of the shielding submodule corresponding to the nonsynchronous node has already generated the output signal indicating that the corresponding node is in a synchronization ready state, thereby simplifying the determination; a person skilled in the art may understand that another implementation may be used, for example, the output signal generating module of the shielding submodule corresponding to the nonsynchronous node is controlled to generate a signal different from the output signal; the output signal generating modules of the shielding submodules corresponding to the to-be-synchronized nodes still generate the output signal in response to receiving the synchronization ready indication signal, and then it is determined in a circuit logic operation manner whether all the to-be-synchronized nodes are already in a synchronization ready state), it is determined that all the to-be-synchronized nodes are in a synchronization ready state, so that the synchronization determining module 3012B generates a synchronization ready signal.

In the optional embodiment, the group synchronization signal generating circuit $301_1$ includes N group node synchronization indication signal generating submodules $3013_1$ to $3013_N$. The group node synchronization indication signal generating submodules $3013_1$ to $3013_N$ are in one-to-one correspondence with the N input terminals of the group synchronization signal generating circuit $301_1$ (in other words, the N group node synchronization indication signal generating submodules $3013_1$ to $3013_N$ are in one-to-one correspondence with the N nodes corresponding to the N input terminals of the group synchronization signal generating circuit $301_1$). Each group node synchronization indication signal generating submodule in the group node synchronization indication signal generating submodules $3013_1$ to $3013_N$ includes two input terminals, that is, a first input terminal and a second input terminal. The first input terminal is connected to the synchronization determining module 3012B. The second input terminal is connected to a corresponding register bit of the register 3011. Each group node synchronization indication signal generating submodule in the N group node synchronization indication signal generating submodules $3013_1$ to $3013_N$ includes one output terminal. Each group node synchronization indication signal generating submodule in the N group node synchronization indication signal generating submodules $3013_1$ to $3013_N$ may send the generated synchronization indication signal to the node synchronization signal generating circuit 302 through the output terminal of the group node synchronization indication signal generating submodule (in the optional embodiment, the N output terminals included in the N group node synchronization indication signal generating submodules $3013_1$ to $3013_N$ also serve as output terminals of the group synchronization signal generating circuit $301_1$).

In an example, the register bits that correspond to the to-be-synchronized nodes in the N register bits of the register 3011 are configured as a first value, and the register bits that correspond to nonsynchronous nodes other than the to-be-synchronized nodes in the N nodes are configured as a second value. In this case, output terminals of the group node synchronization indication signal generating submodules connected to the register bits configured as the second value in the N group node synchronization indication signal generating submodules generate no signal or generate signals other than the synchronization indication signal, in response to receiving the synchronization ready signals from the first input terminals of the group node synchronization indication signal generating submodules. The group node synchronization indication signal generating submodules connected to the register bits configured as the first value in the N group node synchronization indication signal generating submodules generate (send), in response to receiving the synchronization ready signals from the first input terminals of the group node synchronization indication signal generating submodules, the synchronization indication signals through the output terminals of the group node synchronization indication signal generating submodules.

In the optional embodiment, the node synchronization signal generating circuit 302 includes N output terminals. The N output terminals are configured to be connected to the N nodes. The N output terminals are in one-to-one correspondence with the N nodes, so that a synchronization signal may be sent to the N nodes through the output terminals. Optionally, the N output terminals of the N group node synchronization indication signal generating submodules $3013_1$ to $3013_N$ of the group synchronization signal generating circuit $301_1$ are connected to the N input terminals of the node synchronization signal generating circuit 302, so that the node synchronization signal generating circuit 302 can generate (send), in response to receiving the synchronization indication signals from the corresponding output terminals of the group node synchronization indication signal generating submodules, the synchronization signal through the corresponding output terminals.

In an example, the output terminal of the group node synchronization indication signal generating submodule corresponding to the to-be-synchronized nodes in the N group node synchronization indication signal generating submodules generates (sends), in response to receiving the synchronization ready signal from the first input terminal of the group node synchronization indication signal generating submodule, the synchronization indication signal through the output terminal of the group node synchronization indication signal generating submodule. Correspondingly, in the N output terminals of the node synchronization signal generating circuit 302, the output terminal that receives the synchronization indication signal generates the synchronization signal and sends the synchronization signal to the to-be-synchronized nodes, to implement synchronization control on the to-be-synchronized nodes.

It needs to be noted that the first input terminal of each group node synchronization indication signal generating submodule in the group node synchronization indication signal generating submodule $3013_1$ to $3013_N$ is connected to the synchronization determining module 3012B. Therefore, when the synchronization determining module 3012B generates the synchronization ready signal, each group node synchronization indication signal generating submodule in the group node synchronization indication signal generating submodules $3013_1$ to $3013_N$ can simultaneously (or almost simultaneously) receive (or detect) the synchronization ready signal, so that according to indications of the register bits of the register 3011, the group node synchronization indication signal generating submodules corresponding to the to-be-synchronized nodes in the group node synchronization indication signal generating submodules $3013_1$ to $3013_N$ can simultaneously (or almost simultaneously) generate the synchronization indication signal, so as to drive the node synchronization signal generating circuit 302 to simultaneously (or almost simultaneously) generate the synchronization signal corresponding to the to-be-synchronized nodes, to implement synchronization control on the to-be-synchronized nodes.

Figure 4:
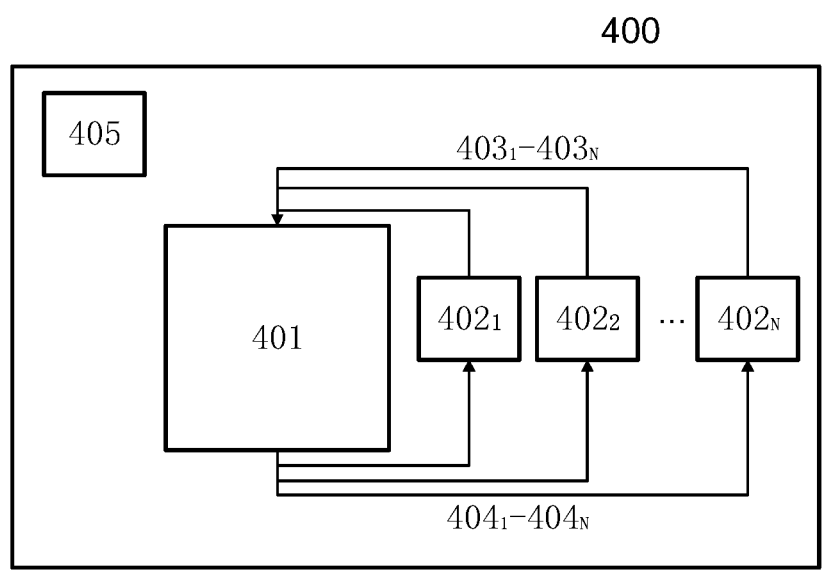
FIG. 4 is a schematic structural diagram of a synchronization chip according to an embodiment of the present disclosure.

FIG. 4 is a schematic structural diagram of a synchronization chip according to an embodiment of the present disclosure. As shown in FIG. 4, a synchronization chip 400 includes a synchronization circuit 401 and N nodes $402_1$ to $402_N$. The synchronization circuit 401 may be the synchronization circuit in any embodiment of the present disclosure. The synchronization chip 400 further includes N first synchronization dedicated communication lines $403_1$ to $403_N$. The N first synchronization dedicated communication lines $403_1$ to $403_N$ are in one-to-one correspondence with the N nodes $402_1$ to $402_N$. The N first synchronization dedicated communication lines $403_1$ to $403_N$ are respectively configured to transmit synchronization ready indication signals sent from the N nodes $402_1$ to $402_N$ to the synchronization circuit 401. Optionally, the synchronization chip 400 further includes N second synchronization dedicated communication lines $404_1$ to $404_N$. The N second synchronization dedicated communication lines $404_1$ to $404_N$ are in one-to-one correspondence with the N nodes $402_1$ to $402_N$. The N second synchronization dedicated communication lines $404_1$ to $404_N$ are respectively configured to transmit a synchronization signal sent from the synchronization circuit 401 to the N nodes $402_1$ to $402_N$. Optionally, the N nodes $402_1$ to $402_N$ include reduced instruction set computer-V (RISC-V) cores.

In an optional embodiment, the synchronization chip 400 further includes a processing unit (i.e., processor) 405. The processing unit 405 is configured to: determine a first node from the N nodes; and select one group synchronization signal generating circuit from the M group synchronization signal generating circuits, and generate a synchronization indication signal corresponding to the first node through the selected one group synchronization signal generating circuit. In the optional embodiment, the one group synchronization signal generating circuit determined by the processor is configured to perform synchronization control on the first node, and the first node is a to-be-synchronized node of the one group synchronization signal generating circuit.

In another optional embodiment, the processor may further determine second nodes from the N nodes; and select a group synchronization signal generating circuit corresponding to the second nodes from the M group synchronization signal generating circuits, and generate the synchronization indication signal corresponding to the second nodes through this selected group synchronization signal generating circuit. In the optional embodiment, the group synchronization signal generating circuit corresponding to the second nodes determined by the processor is configured to perform synchronization control on the second nodes. For example, the second nodes are grouped into S groups, while the selected group synchronization signal generating circuit includes S group synchronization signal generating circuits. The S group synchronization signal generating circuits are in one-to-one correspondence with the S groups of second nodes. Synchronization control is performed on the S groups of second nodes through the S group synchronization signal generating circuits.

Embodiments of the present disclosure further provide a node synchronization method implemented through the foregoing chip. A processing unit assigns nodes for performing a task according to the task, and implements grouping of the nodes by configuring a register, and the synchronization of nodes in a group is implemented through the foregoing processing circuit.

Embodiments of the present disclosure further provide a synchronization method implemented through the foregoing chip. The synchronization method includes: determining a task; determining nodes for performing the task from the N nodes, where the nodes for performing the task are grouped into L groups, and L is a positive integer and is less than or equal to M; and performing synchronization control on the L groups of nodes through L group synchronization signal generating circuits in the M group synchronization signal generating circuits in the synchronization circuit. For example, the steps of the foregoing method are performed through the chip or the processor in the chip.

Embodiments of the present disclosure further provide a computer program. The computer program, when executed by a computer, causes the computer to control any of the synchronization circuits according to the embodiments of the present disclosure to perform synchronization control on nodes, or to control any of the synchronization chips according to the embodiments of the present disclosure to perform synchronization control on nodes.

Embodiments of the present disclosure further provide a computer storage medium. The computer storage medium is configured to store computer-readable instructions. The computer-readable instructions, when executed by a computer, cause the computer to control any of the synchronization circuits according to the embodiments of the present disclosure to perform synchronization control on nodes, or to control any of the synchronization chips according to the embodiments of the present disclosure to perform synchronization control on nodes.

Embodiments of the present disclosure further provide an electronic device. The electronic device includes: a memory configured to store computer-readable instructions; and one or more processors coupled to the memory, and configured to run the computer-readable instructions, so that the processor is caused to run to control any of the synchronization circuits according to the embodiments of the present disclosure to perform synchronization control on nodes, or to control any of the synchronization chips according to the embodiments of the present disclosure to perform synchronization control on nodes.

The flowcharts and block diagrams in the accompanying drawings of the present disclosure show the possible architecture, functions, and operations of a system, the method, and a computer program product according to various embodiments of the present disclosure. In this regard, each block in the flowcharts or block diagrams can represent a module, a program segment or a part of codes, and the module, the program segment or the part of the codes contains one or more executable instructions for implementing the defined logical functions. It should also be noted that in some implementations as alternatives, the functions labeled in the blocks can occur in an order different from the order labeled in the accompanying drawings. For example, two sequentially shown blocks can be substantially executed in parallel in fact, and they sometimes can also be executed in a reverse order, depending on related functions. It should also be noted that each block in the block diagrams and/or the flowcharts and the combination of the blocks in the block diagrams and/or the flowcharts can be implemented by a dedicated system based on hardware for executing defined functions or operations, or can be implemented by a combination of the dedicated hardware and computer instructions.

The units described in the embodiments of the present disclosure may be implemented in a software fashion or may be implemented in a hardware fashion. The names of the units do not constitute a limitation to the units in some cases.

The functions described above herein may be performed, at least in part, by one or more hardware logic components. For example, non-restrictively, exemplary types of hardware logic components that can be used include: a field programmable gate array (FPGA), an application-specific integrated circuit (ASIC), an application-specific standard product (ASSP), a system on chip (SOC), a complex programmable logic device (CPLD), and the like.

In the context of the present disclosure, a machine-readable medium may be a tangible medium that may contain or store a program for use by or in conjunction with an instruction execution system, apparatus or device. The machine-readable medium may be a machine-readable signal medium or a machine-readable storage medium. The machine-readable medium may include, but not limited to, an electronic, magnetic, optical, electromagnetic, infrared or semiconductor system, apparatus or device, or any suitable combination of the foregoing. A more specific example of the machine-readable storage medium includes an electrical connection based on one or more wires, a portable computer disk, a hard disk, a random-access memory (RAM), a read-only memory (ROM), an erasable programmable read-only memory (an EPROM or a flash memory), an optical fiber, a portable compact disk read-only memory (CD-ROM), an optical storage device, a magnetic storage device, or any suitable combination of the above content.

According to one or more embodiments of the present disclosure, a synchronization circuit is provided, including M group synchronization signal generating circuits and a node synchronization signal generating circuit, M being a positive integer. An input terminal of each group synchronization signal generating circuit in the M group synchronization signal generating circuits is configured to be connected to N nodes, N is a positive integer, and N is greater than or equal to M. An output terminal of each group synchronization signal generating circuit in the M group synchronization signal generating circuits is connected to the node synchronization signal generating circuit. An output terminal of the node synchronization signal generating circuit is configured to be connected to the N nodes. The group synchronization signal generating circuit is configured to generate a synchronization indication signal. The node synchronization signal generating circuit is configured to generate a synchronization signal based on the synchronization indication signal generated by the group synchronization signal generating circuit.

Further, each group synchronization signal generating circuit in the M group synchronization signal generating circuits includes a node synchronization indicating module, a synchronization ready signal generating module, and a group node synchronization indication signal generating module. The node synchronization indicating module is configured to indicate to-be-synchronized nodes in the N nodes. The synchronization ready signal generating module is configured to generate a synchronization ready signal when each node in the to-be-synchronized nodes is ready for synchronization. The group node synchronization indication signal generating module is configured to generate the synchronization indication signal based on the synchronization ready signal.

Further, the synchronization ready signal generating module includes a shielding module and a synchronization determining module. The shielding module is configured to: receive synchronization ready indication signals from the N nodes, and generate an output signal according to indication of the node synchronization indicating module. The synchronization determining module is configured to: determine, according to the output signal of the shielding module, whether each node in the to-be-synchronized nodes is ready for synchronization, and generate the synchronization ready signal when it is determined that each node in the to-be-synchronized nodes is ready for synchronization.

Further, the shielding module includes N output signal generating modules. The N output signal generating modules are in one-to-one correspondence with the N nodes. The shielding module is further configured to: for the to-be-synchronized nodes indicated by the node synchronization indicating module, generate, in response to receiving the synchronization ready indication signals from the to-be-synchronized nodes, a first output signal through the output signal generating modules corresponding to the to-be-synchronized nodes; and for nodes other than the to-be-synchronized nodes in the N nodes indicated by the node synchronization indicating module, generate a second output signal through the output signal generating modules corresponding to the nodes other than the to-be-synchronized nodes in the N nodes.

Further, the group node synchronization indication signal generating module is further configured to: generate, in response to receiving the synchronization ready signal, the synchronization indication signal corresponding to the to-be-synchronized nodes indicated by the node synchronization indicating module.

Further, the node synchronization signal generating circuit includes N output terminals. The N output terminals are respectively connected to the N nodes. The node synchronization signal generating circuit is further configured to: generate the synchronization signal corresponding to the to-be-synchronized nodes indicated by the node synchronization indicating module in response to receiving the synchronization indication signal corresponding to the to-be-synchronized nodes; and send the synchronization signal through output terminals corresponding to the to-be-synchronized nodes in the N output terminals.

Further, the node synchronization indicating module includes a register. The register includes at least N register bits. The N register bits are in one-to-one correspondence with the N nodes. Register bits that correspond to the to-be-synchronized nodes in the N register bits are configured as a first value, and register bits that correspond to nodes other than the to-be-synchronized nodes in the N nodes in the N register bits are configured as a second value.

Further, values of the at least N register bits are configured according to a configuration instruction received by the group synchronization signal generating circuit.

According to one or more embodiments of the present disclosure, a synchronization chip is provided. The chip includes any of the foregoing synchronization circuits and N nodes. The synchronization chip further includes: N first synchronization dedicated communication lines, where the N first synchronization dedicated communication lines are in one-to-one correspondence with the N nodes, and the N first synchronization dedicated communication lines are respectively configured to transmit synchronization ready indication signals from the N nodes to the synchronization circuit.

Further, the synchronization chip further includes: N second synchronization dedicated communication lines, where the N second synchronization dedicated communication lines are in one-to-one correspondence with the N nodes, and the N second synchronization dedicated communication lines are respectively configured to transmit a synchronization signal from the synchronization circuit to the N nodes.

Further, the synchronization chip further includes a processing unit, and the processor is configured to: determine a first node from the N nodes; and select one group synchronization signal generating circuit from the M group synchronization signal generating circuits, and generate a synchronization indication signal corresponding to the first node through the one group synchronization signal generating circuit.

Further, the N nodes include RISC-V cores.

The foregoing description is only the description of preferred embodiments of the present disclosure and the used technical principle. A person skilled in the art should understand that the scope of the present disclosure in the present disclosure is not limited to a technical solution formed by a specific combination of the technical features. In addition, other technical solutions formed by any combination of the foregoing technical features or equivalent features thereof shall be encompassed without departing from the concept of the present disclosure. For example, the technical solutions formed by mutual replacement between the foregoing features and the technical features having similar functions (however, the technical features are not limited thereto) disclosed in the present disclosure shall be encompassed.

Furthermore, although a specific order is used to depict the operations, this should not be interpreted that these operations are required to be performed in the specific order shown or in sequential order of execution. Multitasking and parallel processing may be advantageous in particular environments. In addition, while several specific implementation details are included in the above discussion, these should not be construed as limiting the scope of the present disclosure. Some features described in the context of separate embodiments may also be implemented in combination in a single embodiment. Conversely, various features described in the context of a single embodiment may also be implemented in multiple embodiments individually or in any suitable subcombination.

Although the present subject matter has been described using language specific to structural features and/or methodological actions, it should be understood that the subject matter defined in the appended claims is not necessarily limited to the particular features or actions described above. Rather, the particular features and actions described above are merely exemplary forms of implementing the claims.

The invention claimed is:

1. A synchronization circuit, comprising M group synchronization signal generating circuits and a node synchronization signal generating circuit, M being a positive integer, wherein
   an input terminal of each group synchronization signal generating circuit in the M group synchronization signal generating circuits is configured to connect to N nodes, N being a positive integer, and N being greater than or equal to M;
   an output terminal of each group synchronization signal generating circuit in the M group synchronization signal generating circuits is connected to the node synchronization signal generating circuit;
   an output terminal of the node synchronization signal generating circuit is configured to connect to the N nodes;
   the group synchronization signal generating circuit is configured to generate a synchronization indication signal; and
   the node synchronization signal generating circuit is configured to generate a synchronization signal based on the synchronization indication signal generated by the group synchronization signal generating circuit,
   wherein each group synchronization signal generating circuit in the M group synchronization signal generating circuits comprises a node synchronization indicator, a synchronization ready signal generator, and a group node synchronization indication signal generator;

the node synchronization indicator is configured to indicate to-be-synchronized nodes in the N nodes;

the synchronization ready signal generator is configured to generate a synchronization ready signal when each node in the to-be-synchronized nodes is ready for synchronization;

the group node synchronization indication signal generator is configured to generate the synchronization indication signal based on the synchronization ready signal;

the synchronization ready signal generator comprises a shield and a synchronization determiner;

the shield is configured to receive synchronization ready indication signals from the N nodes, and generate an output signal according to indication of the node synchronization indicator; and the synchronization determiner is configured to determine, according to the output signal of the shield, whether each node in the to-be-synchronized nodes is ready for synchronization, and generate the synchronization ready signal when it is determined that each node in the to-be-synchronized nodes is ready for synchronization.

2. The synchronization circuit according to claim 1, wherein the shield comprises N output signal generators, the N output signal generators are in one-to-one correspondence with the N nodes, and the shield is further configured to:

generate, for the to-be-synchronized nodes indicated by the node synchronization indicator, in response to receiving the synchronization ready indication signals from the to-be-synchronized nodes, a first output signal through the output signal generators corresponding to the to-be-synchronized nodes; and generate, for nodes other than the to-be-synchronized nodes indicated by the node synchronization indicator in the N nodes, a second output signal through the output signal generators corresponding to the nodes other than the to-be-synchronized nodes in the N nodes.

3. The synchronization circuit according to claim 2, wherein the group node synchronization indication signal generator is further configured to:

generate, in response to receiving the synchronization ready signal, the synchronization indication signal corresponding to the to-be-synchronized nodes indicated by the node synchronization indicator.

4. The synchronization circuit according to claim 3, wherein some or all nodes in the N nodes are grouped into one or more groups to perform a task, and for the one or more groups, nodes in each group require synchronization control.

5. The synchronization circuit according to claim 4, wherein the to-be-synchronized nodes are nodes that are assigned in one same group.

6. The synchronization circuit according to claim 1, wherein the group node synchronization indication signal generator is further configured to:

generate, in response to receiving the synchronization ready signal, the synchronization indication signal corresponding to the to-be-synchronized nodes indicated by the node synchronization indicator.

7. The synchronization circuit according to claim 6, wherein the node synchronization signal generating circuit comprises N output terminals, the N output terminals are configured to respectively connect to the N nodes, and the node synchronization signal generating circuit is further configured to:

generate the synchronization signal corresponding to the to-be-synchronized nodes indicated by the node synchronization indicator in response to receiving the synchronization indication signal corresponding to the to-be-synchronized nodes; and send the synchronization signal through output terminals corresponding to the to-be-synchronized nodes in the N output terminals.

8. The synchronization circuit according to claim 6, wherein the node synchronization indicator comprises a register, the register comprises at least N register bits, the N register bits are in one-to-one correspondence with the N nodes, register bits that correspond to the to-be-synchronized nodes in the N register bits are configured as a first value, and register bits that correspond to nodes other than the to-be-synchronized nodes in the N nodes in the N register bits are configured as a second value.

9. The synchronization circuit according to claim 8, wherein values of the at least N register bits are configured according to a configuration instruction received by the group synchronization signal generating circuit.

10. The synchronization circuit according to claim 1, wherein the group node synchronization indication signal generator is further configured to:

generate, in response to receiving the synchronization ready signal, the synchronization indication signal corresponding to the to-be-synchronized nodes indicated by the node synchronization indicator.

11. A synchronization chip, comprising the synchronization circuit according to claim 1 and N nodes, wherein the synchronization chip further comprises:

N first synchronization dedicated communication lines, wherein the N first synchronization dedicated communication lines are in one-to-one correspondence with the N nodes, and the N first synchronization dedicated communication lines are configured to respectively transmit synchronization ready indication signals from the N nodes to the synchronization circuit.

12. The synchronization chip according to claim 11, wherein the synchronization chip further comprises:

N second synchronization dedicated communication lines, wherein the N second synchronization dedicated communication lines are in one-to-one correspondence with the N nodes, and the N second synchronization dedicated communication lines are configured to respectively transmit the synchronization signal from the synchronization circuit to the N nodes.

13. The synchronization chip according to claim 12, wherein the synchronization chip further comprises a processor, and the processor is configured to:

determine a first node from the N nodes; and select one group synchronization signal generating circuit from the M group synchronization signal generating circuits, and generate a synchronization indication signal corresponding to the first node through the one group synchronization signal generating circuit.

14. The synchronization chip according to claim 13, wherein the processor is configured to:

determine second nodes from the N nodes; and select a group synchronization signal generating circuit corresponding to the second nodes from the M group synchronization signal generating circuits, and generate the synchronization indication signal corresponding to the second nodes through the selected group synchronization signal generating circuit.

15. The synchronization chip according to claim 14, wherein the second nodes are grouped into S groups, while the selected group synchronization signal generating circuit includes S group synchronization signal generating circuits, and the S group synchronization signal generating circuits are in one-to-one correspondence with the S groups of second nodes, and synchronization control is performed on of the second nodes in the S groups through the S group synchronization signal generating circuits.

16. The synchronization chip according to claim 11, wherein the synchronization circuit further comprises: M group synchronization signal generating circuits and a node synchronization signal generating circuit, M being a positive integer, wherein
   an input terminal of each group synchronization signal generating circuit in the M group synchronization signal generating circuits is configured to connect to N nodes, N being a positive integer, and N being greater than or equal to M;
   an output terminal of each group synchronization signal generating circuit in the M group synchronization signal generating circuits is connected to the node synchronization signal generating circuit;
   an output terminal of the node synchronization signal generating circuit is configured to connect to the N nodes;
   the group synchronization signal generating circuit is configured to generate a synchronization indication signal; and
   the node synchronization signal generating circuit is configured to generate a synchronization signal based on the synchronization indication signal generated by the group synchronization signal generating circuit.

17. The synchronization chip according to claim 11, wherein the N nodes comprise RISC-V cores.

18. An electronic device, wherein the electronic device includes:
   a memory configured to store computer-readable instructions; and one or more processors coupled to the memory and configured to run the computer-readable instructions, so that the processor is caused to run to control the synchronization circuits according to claim 1 to perform synchronization control on nodes.

19. A synchronization circuit, comprising M group synchronization signal generating circuits and a node synchronization signal generating circuit, M being a positive integer, wherein
   an input terminal of each group synchronization signal generating circuit in the M group synchronization signal generating circuits is configured to connect to N nodes, N being a positive integer, and N being greater than or equal to M;
   an output terminal of each group synchronization signal generating circuit in the M group synchronization signal generating circuits is connected to the node synchronization signal generating circuit;
   an output terminal of the node synchronization signal generating circuit is configured to connect to the N nodes;
   the group synchronization signal generating circuit is configured to generate a synchronization indication signal; and
   the node synchronization signal generating circuit is configured to generate a synchronization signal based on the synchronization indication signal generated by the group synchronization signal generating circuit,
   wherein each group synchronization signal generating circuit in the M group synchronization signal generating circuits comprises a node synchronization indicator, a synchronization ready signal generator, and a group node synchronization indication signal generator;
   the node synchronization indicator is configured to indicate to-be-synchronized nodes in the N nodes;
   the synchronization ready signal generator is configured to generate a synchronization ready signal when each node in the to-be-synchronized nodes is ready for synchronization;
   the group node synchronization indication signal generator is configured to generate the synchronization indication signal based on the synchronization ready signal;
   the group node synchronization indication signal generator is further configured to: generate, in response to receiving the synchronization ready signal, the synchronization indication signal corresponding to the to-be-synchronized nodes indicated by the node synchronization indicator; and
   the node synchronization indicator comprises a register, the register comprises at least N register bits, the N register bits are in one-to-one correspondence with the N nodes, register bits that correspond to the to-be-synchronized nodes in the N register bits are configured as a first value, and register bits that correspond to nodes other than the to-be-synchronized nodes in the N nodes in the N register bits are configured as a second value.

20. The synchronization circuit according to claim 19, wherein the synchronization ready signal generator comprises a shield and a synchronization determiner;
   the shield is configured to receive synchronization ready indication signals from the N nodes, and generate an output signal according to indication of the node synchronization indicator; and
   the synchronization determiner is configured to determine, according to the output signal of the shield, whether each node in the to-be-synchronized nodes is ready for synchronization, and generate the synchronization ready signal when it is determined that each node in the to-be-synchronized nodes is ready for synchronization.

* * * * *